United States Patent Office 3,163,685
Patented Dec. 29, 1964

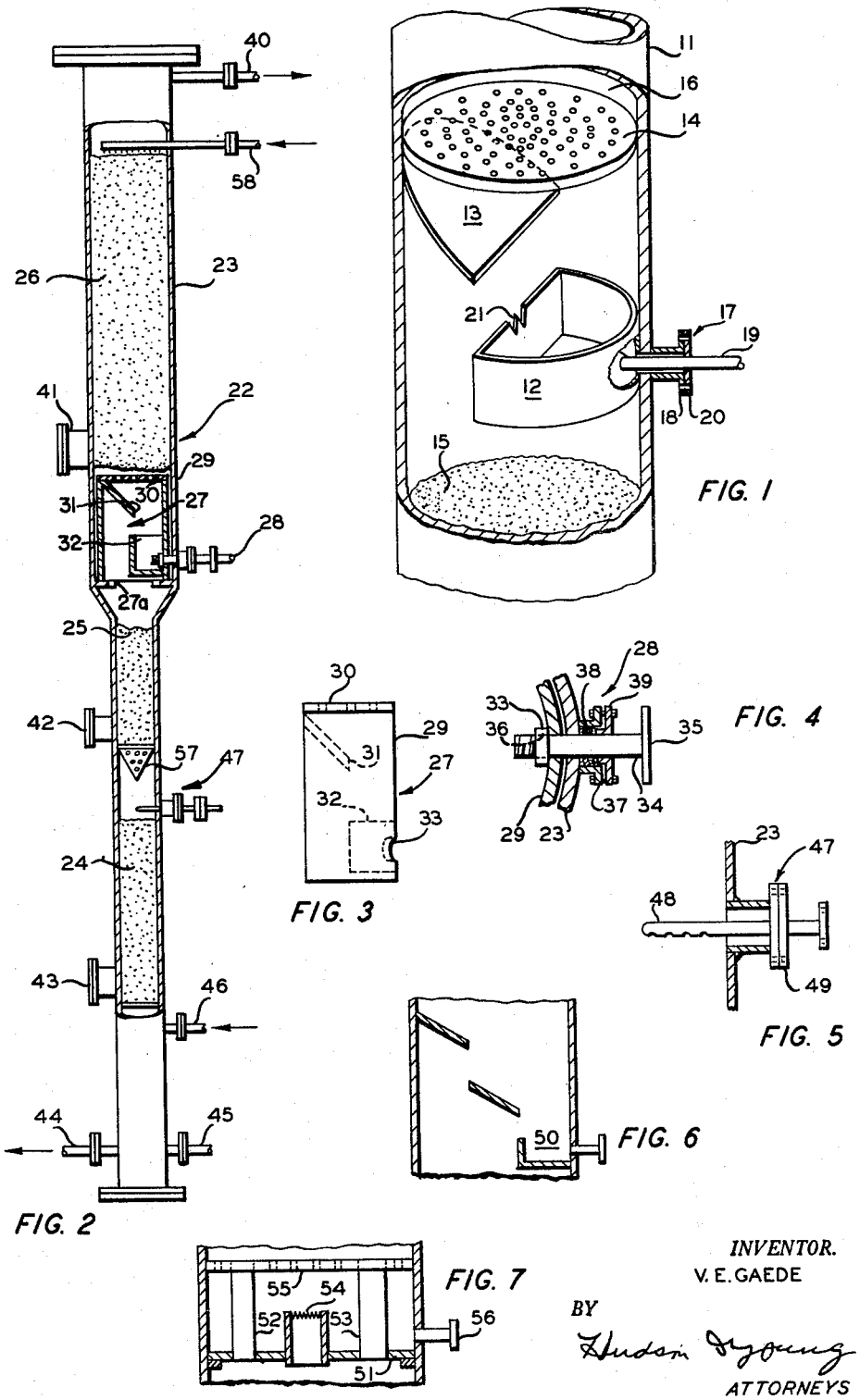

3,163,685
PACKED COLUMN WITH SIDE STREAM WITHDRAWAL
Virgil E. Gaede, Pasadena, Tex., assignor to Phillips Petroleum Company, a corporation of Delaware
Filed July 25, 1960, Ser. No. 45,043
3 Claims. (Cl. 261—97)

This invention relates to a liquid-vapor contacting column having a side liquid draw-off. In one aspect, this invention relates to a vapor-liquid contact tower comprising upper and lower contact chambers, liquid withdrawal means between said chambers and having minimum resistance to vapor flow. In another aspect, this invention relates to such a tower in which the means for liquid withdrawal comprises a liquid collecting chamber, withdrawal means from said chamber, baffle means above the chamber, in which the baffle means and the collecting chamber together cover the entire horizontal cross section of the tower but are spaced apart vertically to provide free flow of vapor upwardly around and between the baffle and chamber from the lower to the upper contact chamber. In another aspect, this invention relates to a tower in which the baffle means, collecting chamber and a packing support member for the upper contact zone are removable from the tower as a unit.

In the design of packed column fractionation towers, it is often desirable to remove a liquid product from an intermediate portion of the tower. This can be accomplished by providing liquid collecting means in this portion of the tower and providing vapor passages vertically through the liquid collecting means. However, previous designs have caused undesirable restrictions of flow of the vapors, the effect being more pronounced as the diameter of the tower is reduced.

It is an object of the present invention to provide a vapor-liquid contact tower having provision for withdrawal of a side product but not unduly restricting vapor flow.

Other aspects, objects and the several advantages of this invention will be apparent from a study of the disclosure, drawing and appended claims.

According to this invention, I have provided a vapor-liquid contact tower comprising upper and lower contact chambers, liquid collecting and distribution means therebetween, the collecting and distribution means comprising liquid directing means and a collecting sump in which the projected cross section of the directing means and the projected cross section of the sump together encompass the entire projected cross section of the tower, the directing means and the sump being separated vertically. Further, according to my invention, there is provided such a tower in which the liquid directing means, the collecting sump and a packing support member thereabove are removable as a unit. Further, according to my invention, I have provided such a tower in which means are provided in the tower shell to permit insertion and sealing of a side-draw conduit and in which means are provided in the collecting chamber for attachment of the side-draw conduit, thus establishing communication from the chamber to the outside of the tower.

In the drawing, FIGURE 1 is a view of a portion of a column with a section of the wall broken away to illustrate the elements of the side withdrawal part of the column.

FIGURE 2 is a partially schematic vertical elevation of a packed column with a portion of the wall broken away to illustrate the packed sections, side withdrawal sections, etc.

FIGURE 3 is a vertical elevation of a removable element according to the invention.

FIGURE 4 is a horizontal cross section of a portion of the side withdrawal area illustrating a suitable seal and attachment for the side withdrawal conduit.

FIGURE 5 is a vertical cross section of a feed sparger for use with the tower.

FIGURE 6 is a vertical cross section of one embodiment of the liquid distribution and collecting means and side withdrawal conduit.

FIGURE 7 is a vertical cross section of a prior art side withdrawal apparatus.

In FIGURE 1, arranged within column shell 11 are liquid collecting chamber 12, liquid distribution means 13 and packing support 14. A portion of the packing material 15 in a lower contact zone is visible below collecting chamber 12 and it will be understood that packing space 16 will also be filled with similar packing material in normal operation. A side withdrawal conduit unit 17 is installed, as shown, to provide a liquid outlet from collecting chamber 12. Since the collecting chamber 12 is not removable in this embodiment, a relatively simple structure, comprising a flange 18 attached to shell 11 and an open end pipe 19 having a flange 20, may be employed. It is noted that both chamber 12 and distribution means 13 are shaped to fill completely the portion of the shell in which each is placed. That is, as illustrated, each of these two units completely fills approximately one half of the cross sectional area of shell 11 and the two are arranged so that, in a horizontal projection, the two together encompass the entire cross section of the column. All of the liquid which flows downwardly through space 16 falls either directly into chamber 12 or is directed into chamber 12 by means 13. Chamber 12 provides sufficient settling space (residence time) so that a sample may be withdrawn through conduit 19 which is not frothy. Once chamber 12 is filled, liquid overflows weir 21 and thus is directed into the central portion of packing 15. Vapors flowing upwardly through the column pass through packing 15, around chamber 12, through the space between chamber 12 and directing means 13 and then upwardly through support 14 and space 16. It will be seen that chamber 12 and distribution means 13 can be spaced vertically to provide a minimum resistance to flow for the vapors.

In FIGURE 2, column 22 comprises shell 23, in which are arranged three packing zones 24, 25 and 26. The side withdrawal section comprises removable element 27 supported on lugs 27A and removable side withdrawal means 28. Removable element 27 is illustrated in FIGURE 3 and comprises a sleeve 29 in which are arranged packing support 30, baffle 31, liquid chamber 32 and threaded connection 33.

Removable side withdrawal means 28 are illustrated in more detail in FIGURE 4. Conduit 34 is provided with a flange on its outer end and with a threaded portion 36 on its inner end. A seal is provided between conduit 34 and shell 23 by a sealing unit comprising body 37, packing 38 and flanged follower 39. Conduit 34 is attached to sleeve 29 by threaded connection 33.

Column 22 comprises, in addition, vapor outlet 40, clean-out openings 41, 42 and 43, liquid level control liquid draw-off 44, reboiler liquid and vapor connections 45 and 46, respectively, and feed inlet 47.

Feed inlet 47 comprises a perforated pipe 48 attached to shell 23 by flange fitting 49. Preferably, pipe 48 is perforated so that the feed is in the central portion of the column.

When it is desired to utilize removable element 27, it may be lowered into position where it is supported by lugs 27A and conduit 34 inserted through the sealing mechanism where it engages threaded connection 33 and is thereby attached to sleeve 29. Flange follower 39 is then bolted snugly against packing 38 in body 37 to provide a seal between conduit 34 and shell 23, and the desired liquid product removal connections can be made to flange 35. Similarly, when it is desired to remove the element from the column, it will be seen that conduit 34 can be readily removed and the element merely lifted upwardly out of the column, the removable flanged cover illustrated on the top of shell 23 being removed.

It is noted that the particular column illustrated in FIGURE 2 comprises three packed liquid-vapor contact zones but, of course, it will be understood that a larger or smaller number of such zones may be utilized and may be desirable in specific installations. Where there are two such zones not separated by a side withdrawal section, a relatively simple redistribution means, such as the perforated cone 57, may be used. Although three clean-out openings have been illustrated, where the side withdrawal element is made removable, as in FIGURE 2, the clean-out operations may be carried out from above, if desired, thus eliminating the need for one or more of the clean-out openings. Reflux inlet 58 is provided, as shown.

FIGURE 6 illustrates a modification of the side draw-off section of a column in accordance with the invention in which the liquid collecting chamber 50 covers less than half of the cross section of the column and the liquid distribution means comprises a plurality of baffles, thus providing adequate vapor flow paths while still directing all of the downflowing liquid to the collecting chamber for redistribution and/or side withdrawal.

Referring now to FIGURE 7 which illustrates a typical prior art side withdrawal means, it will be seen that this apparatus comprises a liquid collecting tray 51 in which are fixed vapor flow pipes 52 and 53 and liquid overflow circular weir 54. Packing support grate 55 is attached to the upper end of the vapor flow pipes 52 and 53 and a side draw connection 56 is provided in the column wall. Particularly as the inside diameter is reduced in such an apparatus, the area of the liquid overflow weir becomes a larger percentage of column cross section, assuming liquid flow to remain unhampered, and the number and diameter of vapor tubes required to pass vapor freely utilizes most of the remaining space so that little liquid volume for hold-up remains. Also, it is often structurally impossible to weld the base of the tubes since the tray floor is mostly holes. Because of the arrangement of elements, it is very difficult to provide sufficient free area for vapor flow up the column. No conventional design can provide as much as 50 percent of column cross sectional area for vapor flow without involving complicated construction, increased height, or sacrifice of liquid hold-up, or vapor and/or liquid distribution.

I have found that, in the design of liquid product withdrawal trays for packed columns, three major factors must be considered for adequate design:

(1) Restriction of vapor and liquid flow up and down the column (should be held to a minimum)
(2) Redistribution of liquid overflow to packing below and
(3) Adequate liquid hold-up in collecting chamber for withdrawal of non-frothy liquid.

The restriction to flow often is the limiting factor on column capacity. Suitable withdrawal and redistribution sometimes may be accomplished without undue restriction but only by increasing column diameter or column height. The present invention accomplishes all of the desired results without the necessity for column enlargement. At the same time, in some embodiments, the elements of the side withdrawal mechanism can be withdrawn from the column so that column packing below can be changed from above.

It will readily be seen by one skilled in the art that, using the principles of the present invention, one can so size the components and position them within the column to achieve the desired liquid hold-up and vapor passage area without sacrificing velocities of vapors that are desired with various types of packing. For example, 50 percent of column free area for vapor flow can be achieved in packed columns of small diameter, which cannot be done with prior art designs without unduly limiting the size of the liquid collecting chamber. In a preferred embodiment, for example, a column similar to that illustrated in FIGURE 2 was constructed in which the lower portion of the column had a diameter of 14 inches, the upper portion 16 inches, and the overall height was 45 feet. The liquid distribution means and the liquid collecting chamber each covered 50 percent of the cross sectional area, terminating on a diameter of the column, and these elements are spaced 6 inches apart. This column has been installed and has been operated successfully as a butene recovery column in a polyethylene manufacturing plant.

Some of the considerations in designing a column in accordance with the present invention include maintaining a minimum overlap of the edge of liquid distribution means 13 and liquid collecting chamber 12, thus incurring minimum restriction of vapor flow; sloping liquid distribution means 13 to prevent restriction between the edge of this member and the packing above, normally a minimum of 45° from the horizontal being desirable; providing weir notches in the wall of collecting chamber 12, usually in the middle of the top edge, to redistribute the liquid overflow to the center of the packaging below.

Typical operating data from a column using the invention as described herein includes feed at a rate of 1.5 g.p.m. fed through line 47, overhead product removed from the column through vapor outlet 40 at a rate of .2 g.p.m., side draw off product removal through side withdrawal means 28 at a rate of 1 g.p.m. and reflux addition to the column through reflux inlet 58 at a rate of 3 g.p.m. With the top temperature to the column maintained at 135° F., the side draw-off temperature at 139° F., the bottom temperature at 320° F., and with a column operated at a pressure of 125 p.s.i.a., the analysis of the feed, overhead product and side draw off are as shown in the following table:

Table

|  | Feed | O.H.P. | Side Draw |
|---|---|---|---|
| Percent Methane | .5 | 3.3 | |
| Percent Ethane | 1.5 | 8.5 | .5 |
| Percent Ethylene | 4.0 | 25.1 | .7 |
| Percent Butene-1 | 71.0 | 63.1 | 97.6 |
| Percent Cyclohexane | 23.0 | | 1.2 |

Reasonable variation and modification are possible within the scope of the foregoing disclosure, the drawing and the appended claims to the invention, the essence of which is that a liquor-vapor contact column is provided with liquid side withdrawal means comprising liquid collecting means, liquid distribution means, the collecting means being spaced vertically below the distribution means, and the two means together, in projected horizontal cross section, encompassing the entire projected horizontal cross section of the column.

I claim:

1. A fractionation column comprising an upper packed contact section comprising a first substantially cylindrical vertical shell containing a suitable packing material, a removable cover for the upper end of said first shell, said cover when removed opening substantially the entire cross section of said first shell, a lower packed contact section comprising a second substantially cylindrical vertical shell having a smaller diameter than said first shell and communicating with said first shell at the lower end thereof, tubular transition means connecting the lower end of said first shell and the upper end of said second shell, a removable intermediate collecting and distribution section comprising a substantially cylindrical wall sleeve having an outside diameter substantially equal to but slightly smaller than the inside of said first shell, a horizontal packing support grate attached to and covering the top of said sleeve, inclined baffle means in said sleeve attached to said sleeve below said grate, a collecting sump in said sleeve below said baffle means attached to said sleeve, said baffle extending across and completely covering a portion of the cross section of said sleeve, said sump extending completely across the remainder of the cross section of said sleeve and being vertically spaced from said baffle means to permit vapor flow therebetween, said baffle serving to direct downwardly flowing liquid into said sump, support means adjacent the bottom of said first shell for supporting said sleeve, a side-draw conduit, an opening in said sleeve, an aperture in said first shell and receiving means in said sump, said opening, said aperture and said receiving means being aligned to receive said conduit to provide a fluid flow path from said sump to the space outside said first shell, sealing means on said first shell adjacent said sump to permit insertion of said conduit and to seal around said side draw conduit between said conduit and said first shell, packing means supported by said grate, means communicating with said column to feed a fluid to be fractionated, means to supply vapor to the interior of said column, an overhead product removal conduit connected with said column and a bottoms product removal conduit connected with said column.

2. A fractionation column comprising a vertical shell, a removable element in said shell, said removable element comprising a sleeve similar in horizontal cross section to said shell and substantially equal in size but slightly smaller than the inside of said shell, a perforated packing support member attached to and covering the top of said sleeve, baffle means in said sleeve attached to said sleeve below said packing support member, a collecting sump in said sleeve below said baffle means attached to said sleeve, said baffle extending across and completely covering a portion of the cross section of said sleeve, said sump extending completely across the remainder of the cross section of said sleeve and being vertically spaced from said baffle means to permit vapor flow therebetween, said baffle serving to direct downwardly flowing liquid into said sump, means in said shell to support said removable element in intermediate position, an opening in said sleeve, an aperture in said shell, a side draw conduit extending through said shell and said sleeve into said sump, sealing means on said shell to form a seal around said side draw conduit between said side draw conduit and said shell, receiving means in said sump aligned with said aperture and said opening to receive said conduit, whereby a fluid flow path is provided from said sump to the space outside said shell, packing means supported by said packing support member, means communicating with said column to feed a fluid to be fractionated, means to supply vapor to the interior of said column, an overhead product removal conduit communicating with said column and a bottoms product removal conduit communicating with said column.

3. A fractionation column comprising a substantially cylindrical vertical shell, a removable element in said shell, said removable element comprising a substantially cylindrical sleeve having an outside diameter substantially equal to but slightly smaller than the inside of said shell, a horizontal packing support grate attached to and covering the top of said sleeve, a baffle in said sleeve attached to said sleeve below said grate, a collecting sump in said sleeve below said baffle means attached to said sleeve, said baffle extending across and completely covering a portion of the cross section of said sleeve, said sump extending completely across the remainder of the cross section of said sleeve and being vertically spaced from said baffle means to permit vapor flow therebetween, said baffle serving to direct downwardly flowing liquid into said sump, means in said shell to support said removable element in an intermediate position, an opening in said sleeve, an aperture in said shell, a side draw conduit extending through said shell and said sleeve into said sump, said side draw conduit having a threaded inner end and a flanged follower immediately outside said shell, a packing body on said shell, packing in said body, said body and said follower confining said packing to form a seal around said side draw conduit between said conduit and said shell, a threaded connection in said sump aligned with said aperture and said opening to receive said threaded end of said side draw conduit, said threaded connection and said side draw conduit forming a fluid flow path from said sump to the space outside said shell, packing means supported by said grate, means communicating with said conduit to feed a fluid to be fractionated, means to supply vapor to the interior of said column, an overhead product removal conduit connected with the upper portion of said column and a bottom product removal conduit connected with the lower portion of said column.

References Cited in the file of this patent

UNITED STATES PATENTS

| | | |
|---|---|---|
| 1,169,765 | Brassert et al. | Feb. 1, 1916 |
| 1,814,125 | Campbell | July 14, 1931 |
| 1,874,849 | Danforth | Aug. 30, 1932 |
| 2,692,129 | Wilson et al. | Oct. 19, 1954 |
| 2,702,699 | Kinney | Feb. 22, 1955 |
| 3,016,234 | Huppmeier | Jan. 9, 1962 |

FOREIGN PATENTS

| | | |
|---|---|---|
| 954,689 | Germany | Dec. 20, 1956 |